US012653196B2

(12) United States Patent
    Gemignani

(10) Patent No.:     US 12,653,196 B2
(45) Date of Patent:     Jun. 16, 2026

(54) ROLLING PIN

(71) Applicant: Tony Gemignani, LLC, San Francisco, CA (US)

(72) Inventor: Tony Gemignani, San Francisco, CA (US)

(73) Assignee: Tony Gemignani, LLC, San Francisco, CA (US)

( * ) Notice: Subject to any disclaimer, the term of this patent is extended or adjusted under 35 U.S.C. 154(b) by 0 days.

(21) Appl. No.: 18/823,289

(22) Filed: Sep. 3, 2024

(65) Prior Publication Data

US 2026/0060258 A1     Mar. 5, 2026

(51) Int. Cl.
    *A21C 3/02*          (2006.01)
    *F16C 19/38*         (2006.01)

(52) U.S. Cl.
    CPC ............ *A21C 3/021* (2013.01); *F16C 19/386* (2013.01)

(58) Field of Classification Search
    CPC .................................................... A21C 3/021
    See application file for complete search history.

(56) References Cited

U.S. PATENT DOCUMENTS

| | | | | |
|---|---|---|---|---|
| 50,528 A | * | 10/1865 | Witsil | A21C 3/021 |
| | | | | 7/111 |
| 278,258 A | * | 5/1883 | Nath | A21C 3/021 |
| | | | | 492/14 |
| 330,421 A | * | 11/1885 | Prentis | A21C 3/021 |
| | | | | 7/111 |
| 670,779 A | | 3/1901 | Henderson | |

| | | | | |
|---|---|---|---|---|
| 950,775 A | * | 3/1910 | Vick | |
| 1,267,327 A | * | 5/1918 | McCarty | A21C 3/021 |
| | | | | 446/76 |
| 1,405,920 A | | 2/1922 | Kerr et al. | |
| 2,629,345 A | * | 2/1953 | Check | A21C 3/021 |
| | | | | 492/14 |
| 2,721,524 A | | 10/1955 | Osborn | |
| 2,734,464 A | * | 2/1956 | Hallock | A21C 3/021 |
| | | | | D7/697 |
| 3,157,135 A | * | 11/1964 | Fetrow | A21C 3/021 |
| | | | | 492/14 |
| 4,107,830 A | * | 8/1978 | Thomson | A21C 3/021 |
| | | | | 492/14 |
| D285,640 S | | 9/1986 | Schmidt | |
| D443,187 S | | 6/2001 | Wright | |
| 6,280,369 B1 | * | 8/2001 | Gibran | A21C 3/021 |
| | | | | 492/14 |

(Continued)

FOREIGN PATENT DOCUMENTS

| | | | | | |
|---|---|---|---|---|---|
| CN | 104304359 A | * | 1/2015 | | |
| EP | 667098 A1 | * | 8/1995 | ............... | A21B 3/00 |

(Continued)

OTHER PUBLICATIONS

Translation of CN-104304359-A (Year: 2015).*
French Classical Rolling Pin Roti Roller, first available Aug. 13, 2021, Amazon, [online], [site visited Jul. 23, 2025], Available from internet URL: https://www.amazon.eg/-/en/French-Classical-Rolling-Natural-Design-15/dp/B09414CCFH (Year: 2021).

(Continued)

*Primary Examiner* — Jacob J Cigna
(74) *Attorney, Agent, or Firm* — Duane Morris LLP

(57)     ABSTRACT

A rolling pin includes a body portion having an outer surface that tapers from a center toward a first end and toward a second end. The rolling pin also includes a first handle connected to the first end of the body portion and a second handle connected to the second end of the body portion.

13 Claims, 5 Drawing Sheets

(56)     References Cited

U.S. PATENT DOCUMENTS

| | | | | |
|---|---|---|---|---|
| 6,484,341 B2 * | 11/2002 | Hefti | ...................... | A21C 3/021 |
| | | | | 7/111 |
| 7,052,450 B2 * | 5/2006 | Dua | ...................... | A21C 3/021 |
| | | | | 492/14 |
| D550,523 S | 9/2007 | Stewart et al. | | |
| 7,381,125 B2 * | 6/2008 | Stewart | .................. | A22C 9/004 |
| | | | | 452/141 |
| D696,564 S | 12/2013 | Sparks et al. | | |
| D909,834 S | 2/2021 | Lee | | |
| 11,202,451 B2 * | 12/2021 | Melkonyan | ............ | A21C 3/021 |
| 2002/0116767 A1 * | 8/2002 | Hefti | ...................... | A21C 3/021 |
| | | | | 7/111 |
| 2005/0176565 A1 | 8/2005 | Dua et al. | | |
| 2019/0357546 A1 * | 11/2019 | Melkonyan | ............ | A21C 3/021 |

FOREIGN PATENT DOCUMENTS

| | | | | | |
|---|---|---|---|---|---|
| FR | 1084739 A | * | 6/1953 | | |
| WO | WO-0135749 A1 | * | 5/2001 | ............ | A21C 3/021 |
| WO | D2443-001 | | 2/2025 | | |

OTHER PUBLICATIONS

French Rolling Pin for Baking—Tuyotue, first available May 16, 2023, Amazon, [online], [site visited Jul. 23, 2025], Available from internet URL: https://www.amazon.ca/French-Rolling-Baking-11-8-Inches/dp/BOC5C3J1J2 (Year: 2023).

Tony Gemignani's Post, posted Jun. 17, 2025, Facebook, [online], [site visited Jul. 23, 2025], Available from internet URL: https://www.facebook.com/tony.gemignani.5/posts/thank-you-san-francisco-business-times-for-this-wonderful-article-about-the-begi/24648318634770397/(Year: 2025).

* cited by examiner

ROLLING PIN

FIELD

The present disclosure relates to rolling pins and related methods of preparing dough.

BACKGROUND

This section provides background information related to the present disclosure which is not necessarily prior art.

Rolling pins are often used in the preparation of dough to make various articles of food. Dough may be in the form of a ball or a lump after it has been prepared. Various articles of food may require the dough to be flattened to a desired thickness before it is used to prepare the article of food. Pizza dough is an example type of dough that is flattened and/or stretched before sauce, cheese, and/or other toppings are positioned on the dough prior to baking. Existing or traditional rolling pins may include a weighted surface that is rolled along a top surface of the dough to flatten and/or stretch the dough to a desired size and/or thickness. Existing or traditional rolling pins, however, suffer from drawbacks. Existing or traditional rolling pins may not allow a user to shape and/or flatten dough in a way to produce a pizza crust with desirable characteristics. There exists a need, therefore, for improved rolling pins that may allow a user to shape, flatten, and/or otherwise work the dough to produce a pizza crust with the desired shape and with desired culinary characteristics.

SUMMARY

This section provides a general summary of the disclosure, and is not a comprehensive disclosure of its full scope or all of its features.

In some examples of the present disclosure, a rolling pin is provided. The rolling pin may include a body portion having an outer surface that tapers from a center toward a first end and toward a second end, a first handle connected to the first end of the body portion, and a second handle connected to the second end of the body portion.

In one aspect, the outer surface may curve toward the first end and toward the second end.

In another aspect, a diameter of the body portion is greatest at the center thereof.

In another aspect, the body portion may be rotatably connected to the first handle and the second handle.

In another aspect, a slope of the outer surface of the body portion may gradually increases in a direction from the center toward the first end and toward the second end.

In another aspect, the rolling pin may also include an axle connecting the first handle to the body portion.

In another aspect, the rolling may also include at least one bearing contacting the axle.

In another aspect, the body portion may have a center diameter that is at least 1 inch larger than a first end diameter of the body portion.

In another aspect, the center diameter may be at least 1 inch larger than a second end diameter of the body portion.

In some embodiments of the present disclosure, a rolling pin may include a first handle and a second handle connected to opposite ends of a body portion, wherein the body portion comprises a curved outer surface that tapers in a direction toward the first handle and the second handle.

In one aspect, the curved outer surface of the body portion may decrease in diameter from a center to the ends of the portion at an increasing rate.

In another aspect, a diameter of a center of the body portion may be at least 1 inch larger than a diameter of the body portion at each end.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
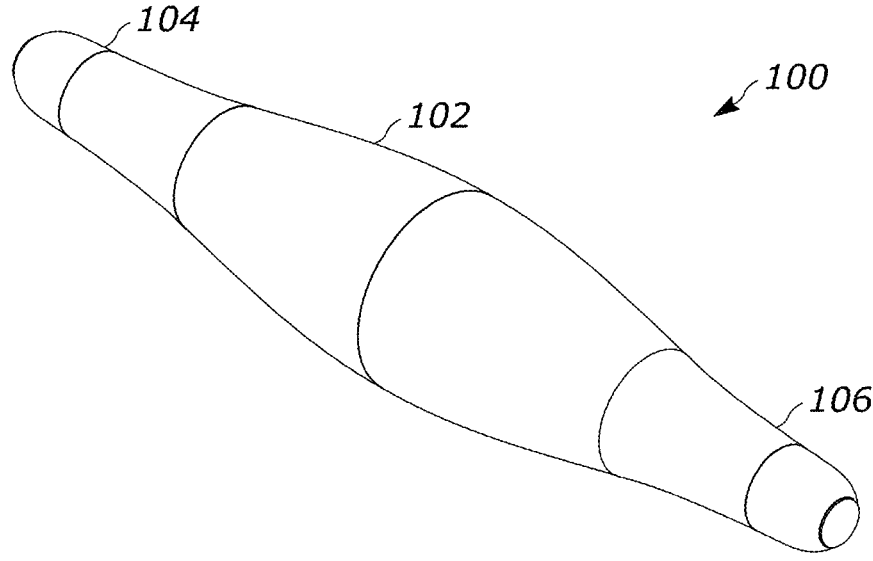
FIG. 1 is an isometric view of an example rolling pin in accordance with some embodiments of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In various example embodiments, the rolling pins of the present disclosure have a shape that allows dough, such as pizza dough, to be flattened or rolled without disturbing an edge portion of the dough. A pizza crust may be formed from a ball of pizza dough by flattening the center portion of the dough while leaving an edge portion of the dough raised. Traditional or existing rolling pins typically have a rolling surface that is flat with a cylindrical shape. Such a shape does not allow for shaping a pizza dough at a center portion differently from the edge portions. Traditional or existing rolling pins typically cause the entire ball of dough to flattened and then the pizza maker must shape the edges of the dough to form the raised edge or crust of the pizza.

Traditional rolling pins require the formation of the edges after rolling and also cause the pizza dough to be de-gassed at both the center portion and at the edge. This may cause the pizza crust not to have a desired consistency at the center portion of the pizza and/or at the edge portions of the pizza.

The rolling pins of the present disclosure are improvements over existing rolling pins by having a curved or non-linear outer surface or profile. The curved or non-linear outer surface of the rolling pins of the present disclosure allow a pizza maker to flatten a ball of pizza dough at a center of the pizza without disrupting the edge portions of the pizza. The rolling pins of the present disclosure allow a uniform and direct pressure to be exerted on the pizza dough at the center portions of the pizza and leave the edge portions of the pizza undisturbed by the rolling process. This process results in improved pizza crust texture and consistency. The center portion of the pizzas made using the rolling pins and rolling processes of the present disclosure creates a crispy crust and consistent, even dough surface.

Figure 2:
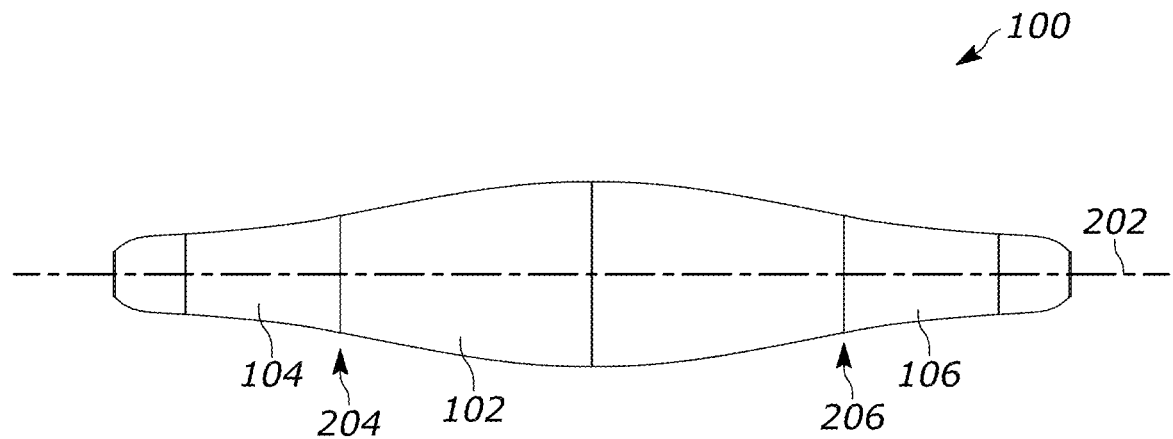
FIG. 2 is a side view of the rolling pin of FIG. 1.

Referring now to FIGS. 1 and 2, an example rolling pin 100 is illustrated. The rolling pin 100 may include a body portion 102, a first handle 104 and a second handle 106. The body portion 102 may extend between the first handle 104 and the second handle 106. As shown, the body portion 102 may have a tapered outer surface that may have the largest diameter at a center of the body portion 102 and then taper as the outer surface moves toward each of the first handle 104 and the second handle 106. The rolling pin 100 may be symmetrical about the center of the body portion 102 and have a similar shape at each end.

The rolling pin 100 may be also be symmetrical about an axis 202. The body portion 102 may be shaped such that the change or taper of the body portion 102 is not constant as the surface of the body portion 102 moves toward the first handle 104 and the second handle 106 from the center. An outer diameter of the body portion 102 changes more slowly for the first half of the body portion 102 and then changes more quickly on for the second half of the body portion 102 away from the center. Said differently, the slope of the outer surface of the body portion 102 is not constant. The slope of the surface (as defined by a tangent to the surface) is less toward the center and then the slope of the outer surface increases as you move away from the center of the body portion 102.

The aforementioned shape of the body portion 102, creates a center portion with a smooth surface that is more flat at the center and then more tapered away from the center. This shape may allow a user to shape a dough of pizza dough to flatten the dough in the center of the pizza dough without flattening the edges of the pizza dough. This produces a pizza crust with desired characteristics that may differ between the center portion of the crust and the edges of the pizza crust.

As further shown in this example, the first handle 104 and the second handle 106 may each be joined to the body portion 102 at a first joint 204 and a second joint 206, respectively. In some examples, the first handle 104 and the second handle 106 may be joined with a rotating joint to allow the body portion 102 to rotate relative to the first handle 104 and the second handle 106. This may allow a user to exert constant and uniform pressure on the pizza dough.

Figure 3:
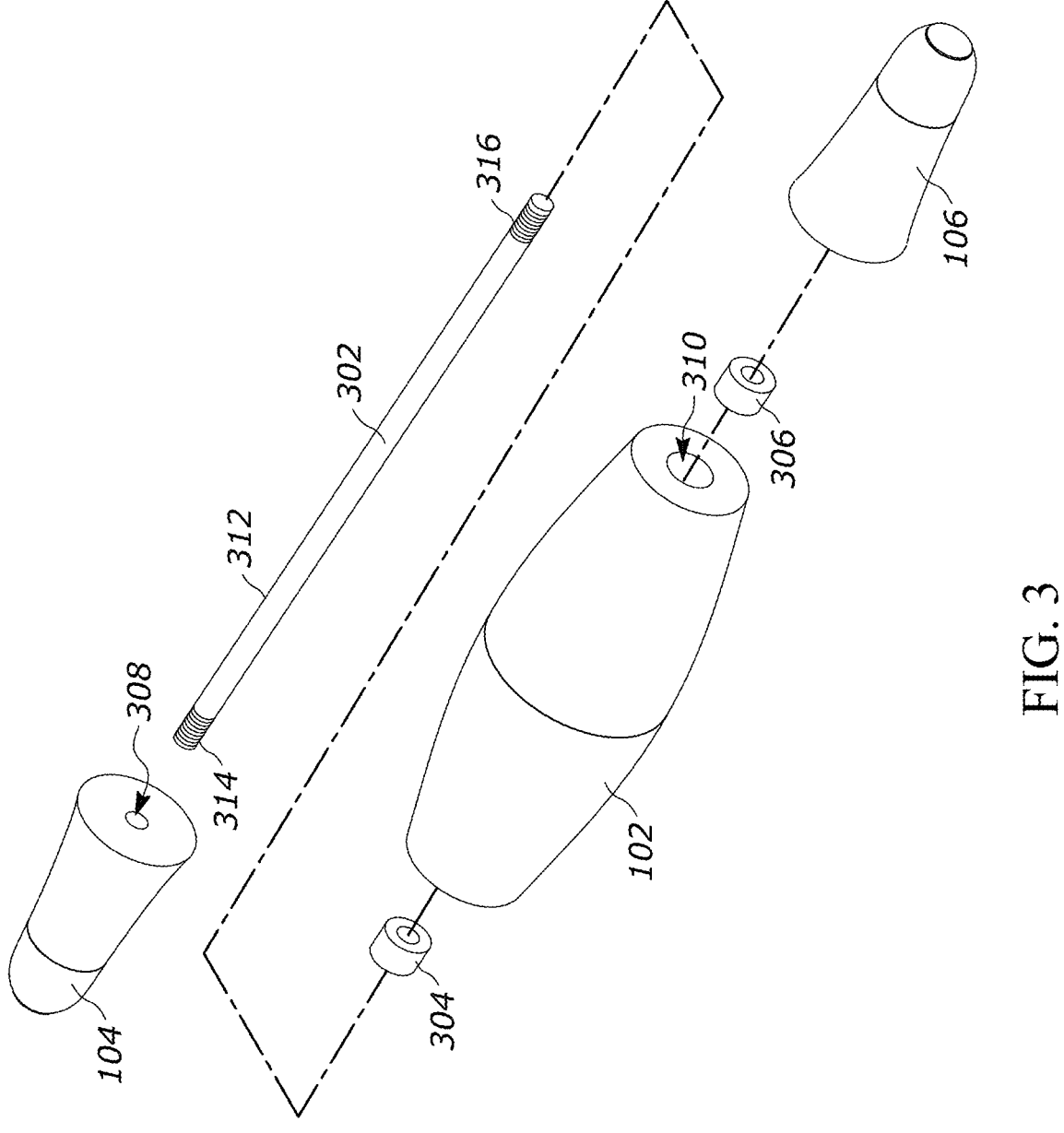
FIG. 3 is an exploded view of the example rolling pin of FIG. 1.
Figure 4:
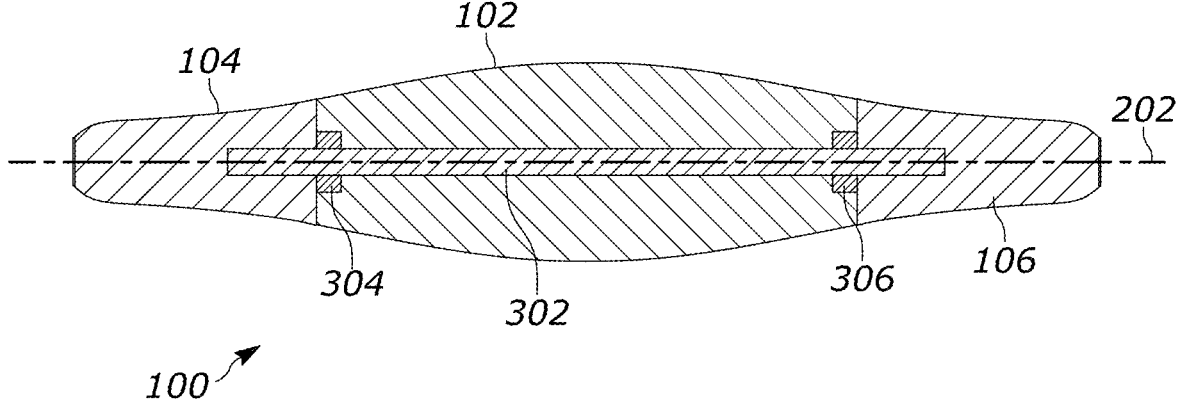
FIG. 4 is a side sectional view of the rolling pin of FIG. 1.

Turning now to FIGS. 3 and 4, further details of one embodiment of the rolling pin 100 is shown. In this example, the first handle 104 and the second handle 106 may be joined to the body portion 102 with an axle 302. A first end 314 of the axle 302 may be joined to the first handle 104 and a second end 316 of the axle 302 may be joined to the second handle 106. The axle 302 may be positioned through a center bore 310 of the body portion 102. The middle part 312 of the axle 302 may be positioned inside the body portion 102 and the first end 314 and the second end 316 may extend outward of the body portion 102. The first handle 104 and the second handle 106 may be attached to the first end 314 and the second end 316, respectively. The first end 314 and/or the second end 316 may include a threaded portion that may allow the first handle 104 and the second handle 106 to be connected to the axle. In other examples, other fasteners, adhesive, press fit, or other connecting methods may be used to secure the handles to the axle 302.

The axle 302 may be sized such that the first handle 104 and the second handle 106 are positioned adjacent the joining ends of the body portion 102 when they are secured into position. As also shown, the rolling pin 100 may include a first bearing 304 and a second bearing 306. The bearings, 304, 306 may be suitable ball or roller bearings to allow smooth rotation of axle 302. In this example, the bearings 304, 306 are positioned in the body portion 102. In other examples, the bearing 304, 306 may be positioned in the first handle 104 and/or the second handle 106. Still further, other bushings, collars or other friction reducing elements may be used to facility smooth rotation of the body portion 102 relative to the handles 104, 106.

It should be appreciated that variations of the construction shown in FIGS. 3 and 4 are also contemplated. In other examples, the rolling pin 100 may include two separate axles with one for each of the first handle 104 and the second handle 106. In still other examples, the axle may not extend through the body portion 102. An axle may be fixed to each of the handles 104, 106 and then connected to the body portion 102. In still other examples, no bearings or bushings may be used and/or other surface preparations may be used to allow rotation of the body portion 102 relative to the handles 104, 106.

Figure 5:
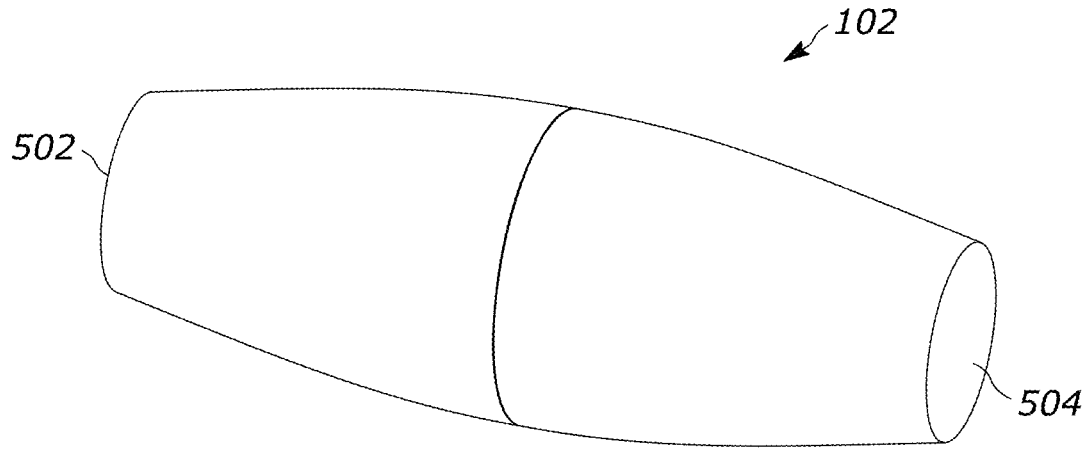
FIG. 5 is an isometric view of an example body portion of the rolling pin of FIG. 1.
Figure 6:
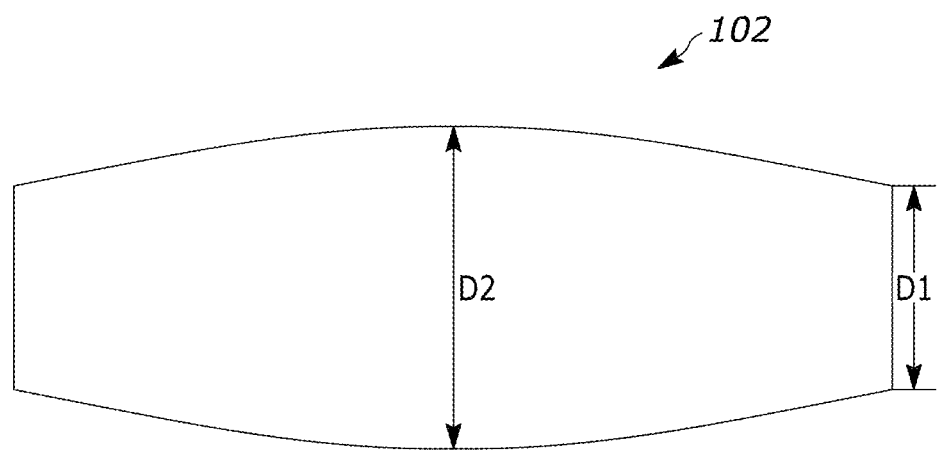
FIG. 6 is a side of the body portion of FIG. 5.

As shown in FIGS. 5 and 6, the body portion 102 may be shaped to allow for the flattening of dough at a center of a mass of dough without impacting an outer edge. As discussed above, the center of the body portion may have the greatest outer diameter D2. The body portion 102 may taper in a direction away from the center diameter D2. The body portion 102 may have the smallest outer diameter DI at ends 502, 504 of the body portion. The outer profile of the body portion 102 is tapered and curved. The taper of the body portion 102 may be non-linear with a slope that changes along its surface in a direction away from the center diameter D2.

The center diameter D2 may be less than the end diameter D1. In some examples, the difference between the center diameter D2 and the end diameter D1 may be greater than 1.0 inches. In some examples, the difference between the center diameter D2 and the end diameter D1 may be greater than 1.1 inches. In one preferred example, the difference between the center diameter D2 and the end diameter D1 may be about 1.2 inches. In the preferred example, the center diameter D2 may be about 3.25 inches and the end diameter D1 may be about 2.06 inches.

An overall length of the body portion 102 may be provided so that the rolling pin is small enough to allow for the flattening of pizza doughs to make pizzas having an overall diameter in a range of about 10 inches to about 16 inches. In some examples, the length is provided for the creation of pizzas having an overall diameter of about 12 inches. In some examples, an overall length of the body portion is about 7 inches to about 10 inches. In other examples, the overall length of the body portion 102 is about 8 inches to about 9 inches. In a preferred example, the overall length of the body portion 102 is about 8.9 inches.

Figure 7:
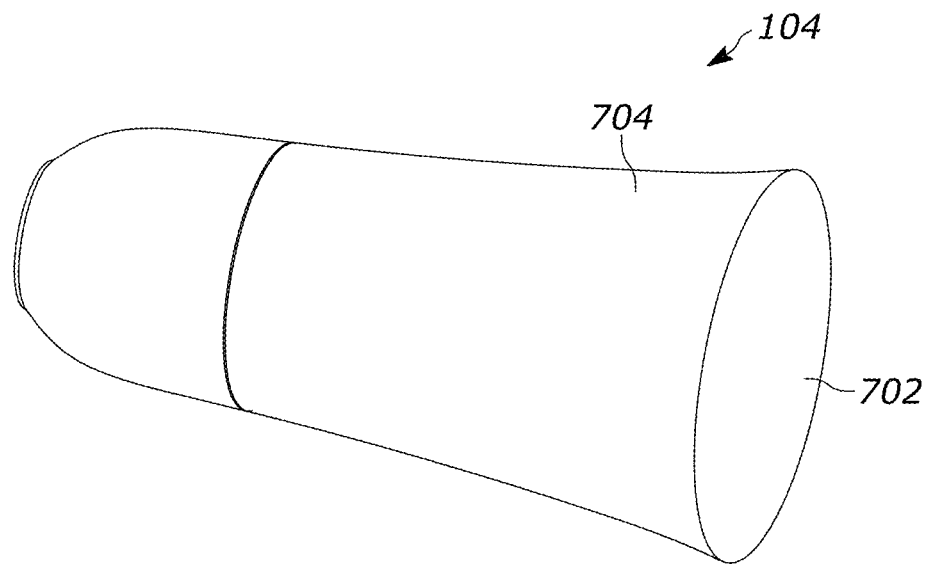
FIG. 7 is an isometric view of an example handle of the rolling pin of FIG. 1.
Figure 8:
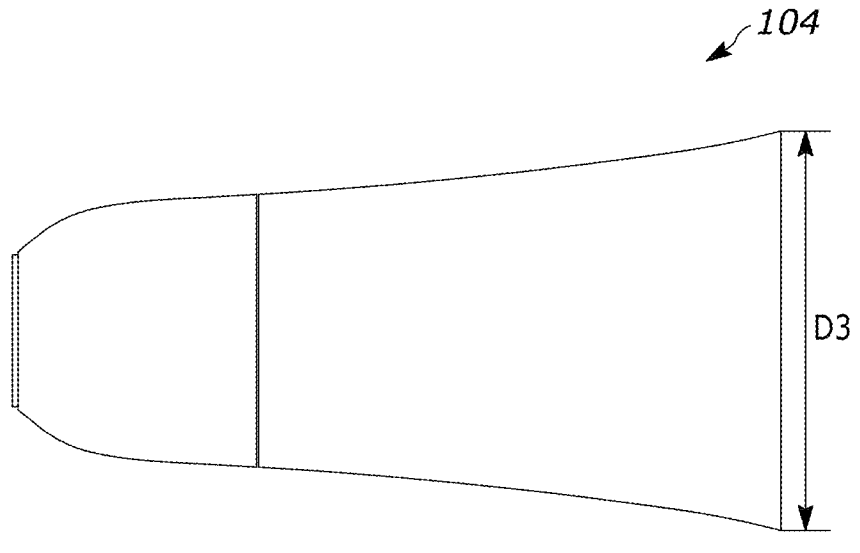
FIG. 8 is a side view of the handle of FIG. 7.

Referring now to FIGS. 7 and 8, an example first handle 104 is illustrated. The first handle 104 may be similar to the second handle 106. While the first handle 104 is described below, it should be appreciated that the second handle 106 may be similarly configured.

The first handle 104 may have a smooth outer surface 704. The end 702 of the first handle 104 may be sized so as to fit adjacent the ends of the body portion and may provide a smooth transition from the body portion 102 to the handle 104. The joining end of the handle 104 may have an outer diameter D3. The diameter D3 may be similar in size to the end of the body portion 102. This may provide an aesthetically pleasing and ornamental appearance to the rolling pin 100.

The handle 104 may be sized with an overall length to comfortably accommodate a user hands. In some examples, the handle 104 may have an overall length of about 3.5 to about 4.5 inches. In a preferred example, the handle 104 may have an overall length of about 4 inches.

The body portion 102 and the handles 104, 106 may be made of the same material in some examples. In other examples, the body portion 102 may be made of a different material than the handles 104, 106. In some examples, the rolling pin 100 may be constructed of suitable hard wood material such as a maple, cherry, walnut, beech, or other hard woods. In other examples, other materials may be used such as a metal, alloy, marble, hard plastic or other suitable hard material that may withstand the constant pressure and force exerted during rolling processes.

The present disclosure also contemplates various methods of use of the rolling pins. In some example methods, a ball of dough may be pressed or rolled using one of the rolling pins of the present disclosure. During such a flattening process, a center of the dough may be flattened without flattening of the edges of the dough. The rolling pin (at least one of the handles 104, 106) may be positioned to extend over an edge of the dough while the rolling process is performed. The curved and tapered shape of the body portion 102 may allow the center of the dough to be compressed without contacting the edge of the dough. Such a process may result in improved consistency and texture of a cooked pizza crust.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A rolling pin comprising:
    a body portion having a curved outer surface symmetrical about a center plane that tapers from the center plane toward a first end and toward a second end, wherein a slope of the outer surface is not constant between the center plane to the first end and to the second end;
    a first handle rotatably connected to the first end of the body portion;
    a second handle rotatably connected to the second end of the body portion;
    an axle connecting the first handle to the body portion; and
    at least one bearing contacting the axle.

2. The rolling pin of claim 1, wherein a length of the body portion is in a range of 8 inches to 9 inches and a center diameter of the body portion is at least 1 inch larger than a first end diameter of the body portion.

3. The rolling pin of claim 1, wherein a diameter of the body portion is greatest at the center thereof.

4. The rolling pin of claim 1, wherein the first handle and the second handle each comprise a smooth tapered shape in which a joining end of each of the first handle and the second handle has a diameter that is the same size as a diameter of the first end of the body portion and the second end of the body portion, respectively.

5. The rolling pin of claim 1, wherein the slope of the outer surface of the body portion increases in a direction from the center plane toward the first end and toward the second end.

6. The rolling pin of claim 1, wherein the body portion has a center diameter that is at least 1 inch larger than a first end diameter of the body portion.

7. The rolling pin of claim 6, wherein the center diameter is at least 1 inch larger than a second end diameter of the body portion and the center diameter is at least 3 inches.

8. A rolling pin comprising:

a body portion comprising an outer surface that symmetrically tapers from a center plane toward a first end and toward a second end about a center axis;

a first handle aligned along the center axis and rotatably connected to the first end of the body portion and supported via a first bearing, the first handle having a first diameter that is the same as a diameter of the body portion at the first end; and a second handle aligned along the center axis and rotatably connected to the second end of the body portion and supported via a second bearing, the second handle having a second diameter that is the same as a diameter of the body portion at the second end.

9. The rolling pin of claim 8 wherein a length of the body portion is in a range of 8 inches to 9 inches and a center diameter of the body portion is at least 1 inch greater than the diameter of the first end of the body portion.

10. The rolling pin of claim 8, wherein first handle comprises a joining surface at the first diameter, the joining surface being oriented perpendicular to the center axis, the joining surface positioned adjacent a planar surface at the first end of the body portion.

11. The rolling pin of claim 8, wherein an outer diameter of the body portion changes more slowly for a first half of the body portion relative to the center plane and changes more quickly on the second half of the body portion relative to the center plane.

12. The rolling pin of claim 8, further comprising an axle extending through the body portion and supported by the first bearing.

13. The rolling pin of claim 12, wherein the axle is connected to the first handle and the second handle.

* * * * *